United States Patent
Grunder et al.

(10) Patent No.: US 11,814,552 B2
(45) Date of Patent: Nov. 14, 2023

(54) LATENT TWO-PART POLYURETHANE ADHESIVES

(71) Applicant: DDP SPECIALTY ELECTRONIC MATERIALS US, LLC, Wilmington, DE (US)

(72) Inventors: Sergio Grunder, Freienbach (CH); Stefan Schmatloch, Freienbach (CH); Joel Kunz, Horgen (CH)

(73) Assignee: DDP SPECIALTY ELECTRONIC MATERIALS US, LLC, Wilmington, DE (US)

( * ) Notice: Subject to any disclaimer, the term of this patent is extended or adjusted under 35 U.S.C. 154(b) by 712 days.

(21) Appl. No.: 16/975,562

(22) PCT Filed: Feb. 21, 2019

(86) PCT No.: PCT/US2019/018912
§ 371 (c)(1),
(2) Date: Aug. 25, 2020

(87) PCT Pub. No.: WO2019/182715
PCT Pub. Date: Sep. 26, 2019

(65) Prior Publication Data
US 2020/0399513 A1     Dec. 24, 2020

Related U.S. Application Data

(60) Provisional application No. 62/644,775, filed on Mar. 19, 2018.

(51) Int. Cl.
| | |
|---|---|
| C09J 175/08 | (2006.01) |
| C08G 18/12 | (2006.01) |
| C08G 18/32 | (2006.01) |
| C08G 18/48 | (2006.01) |
| C08G 18/66 | (2006.01) |
| C08G 18/72 | (2006.01) |
| C08G 18/73 | (2006.01) |
| C08G 18/76 | (2006.01) |
| C08K 3/013 | (2018.01) |
| C08K 3/22 | (2006.01) |

(52) U.S. Cl.
CPC ............ *C09J 175/08* (2013.01); *C08G 18/12* (2013.01); *C08G 18/3206* (2013.01); *C08G 18/4816* (2013.01); *C08G 18/4825* (2013.01); *C08G 18/4829* (2013.01); *C08G 18/4841* (2013.01); *C08G 18/6674* (2013.01); *C08G 18/724* (2013.01); *C08G 18/73* (2013.01); *C08G 18/7671* (2013.01); *C08K 3/013* (2018.01); *C08K 2003/2206* (2013.01)

(58) Field of Classification Search
None
See application file for complete search history.

(56) References Cited

U.S. PATENT DOCUMENTS

| | | | |
|---|---|---|---|
| 2009/0124751 A1* | 5/2009 | Lucas | C09D 175/04 524/588 |
| 2015/0259465 A1* | 9/2015 | Burckhardt | C04B 40/065 524/839 |
| 2018/0171059 A1* | 6/2018 | Schmatloch | C08G 18/244 |

FOREIGN PATENT DOCUMENTS

| | | |
|---|---|---|
| WO | WO2016/205251 | 12/2016 |
| WO | WO2016/205252 | 12/2016 |
| WO | WO2016/205254 | 12/2016 |

* cited by examiner

*Primary Examiner* — Christopher M Rodd

(57) ABSTRACT

Two-component polyurethane adhesives include a polyol component and a polyisocyanate component. The polyol component includes a high functionality polyether polyol and precipitated calcium carbonate particles having a particle size of up to 200 nm. The adhesive has an excellent combination of a prolonged open time followed by curing to form a strong adhesive bond.

15 Claims, No Drawings

LATENT TWO-PART POLYURETHANE ADHESIVES

This invention relates to latent two-part polyurethane adhesives.

Adhesives are replacing many types of mechanical fasteners in vehicle production. This is driven in part by a desire to minimize vehicle weight. Using adhesives to supplement or replace mechanical fasteners provides operational advantages because manufacturing processes can be simplified. Gluing can also provide significant aesthetic advantages in some cases.

Adhesives provide particular benefits when used to adhere plastic materials to each other or to metals in automotive construction. Carbon fiber-reinforced polymers (CFRPs), for example, are being used with greater frequency. Adhesives that form strong bonds to CFRPs are strongly desired.

Latency is a desirable attribute of many vehicular adhesive systems. A rapidly-curing adhesive does not allow much time for the adhesive to be applied and the substrates to be positioned correctly. Therefore, the adhesive preferably is formulated to have a reasonably long open time at room temperature (22±2° C.) during which it remains flowable enough to allow the substrates to be joined.

Although these adhesives are often cured at an elevated temperature to take advantage of faster curing kinetics, there is often a need for them to develop some bond strength in a short time, even at room temperature. In some manufacturing processes, for example, production considerations prevent the adhesive from being thermally cured immediately after application. Nonetheless, the adhesive is called upon to develop enough bond strength to allow the glued parts to be handled until such later time as a thermal cure can be effected. Therefore, what is desired is an adhesive that has a useful open time, but thereafter develops reasonable bond strength at room temperature or a moderately elevated temperature.

Certain polyurethane adhesives systems are useful in these automotive applications. An example of such an adhesive is described in WO 2016/205254. This two-part adhesive achieves a good combination of latency with strong adhesion to CFRPs. This effect is accomplished in part through the use of a particular polyisocyanate prepolymer and by including rather large amounts of an aliphatic diol chain extender in the formulation. This adhesive performs well, but further modifications are wanted for certain applications. It is designed primarily for oven-curing or other thermally-induced curing methods such as IR or induction curing. Open times are on the order of 20-30 minutes. Property development at approximately room temperature is not as rapid as is sometimes wanted.

WO 2016/205251 describes another two-part polyurethane adhesive designed for automotive applications. This system makes use of a three-component catalyst system to provide latency. It is designed to have a shorter open time than that described in WO 2016/205254, the open times being in the range of only 5-7 minutes. Once again, however, property development at room temperatures is not as rapid as is sometimes wanted.

This invention is in one aspect a two-component polyurethane adhesive composition having a polyol component and an isocyanate component, wherein:

the polyol component comprises:
a) at least 35 weight percent, based on the weight of the polyol component, of a mixture of polyether polyols, the mixture of polyether polyols comprising a-1) one or more polyether polyols each having a hydroxyl equivalent weight of 400 to 2000 and each being selected from homopolymers of propylene oxide and copolymers of 70 to 99% by weight propylene oxide and 1 to 30% by weight ethylene oxide, the one or more polyether polyols a-1) having an average nominal hydroxyl functionality of 2 to 4 and;

a-2) one or more polyether polyols each having a hydroxyl equivalent weight of 100 to 399, the one or more polyether polyols a-2) having an average nominal functionality of at least 4, wherein the one or more polyether polyols a-2) are present in an amount of at least 2 weight percent, based on the weight of the polyol component;

b) one or more aliphatic diol chain extenders having a hydroxyl equivalent weight of up to 99;

c) 0 to 3 parts by weight per 100 parts by weight of a) of at least one compound having at least two primary and/or secondary aliphatic amine groups;

d) a catalytically effective amount of at least one urethane catalyst;

e) 5 to 60 weight percent, based on the weight of the polyol component, of at least one particulate filler, wherein the particulate filler includes precipitated calcium carbonate filler particles having a particle size of up to 200 nm;

and the polyisocyanate component comprises at least one organic polyisocyanate and 0 to 50% by weight, based on the total weight of the polyisocyanate component, of at least one particulate filler.

The invention is also a cured adhesive formed by combining the polyol and polyisocyanate components of the invention to form an uncured adhesive, and then curing the uncured adhesive. The invention is also a method of bonding two substrates, comprising combining the polyol and polyisocyanate components of the invention to form an uncured adhesive, forming a layer of the uncured adhesive at a bondline between two substrates, and curing the uncured adhesive layer at the bondline to form a cured adhesive bonded to each of the substrates.

The adhesive composition adheres strongly to many substrates. It exhibits excellent adhesion to plastics and to composites such as CFRP.

Surprisingly, the adhesive composition exhibits an excellent combination of open time and rapid development of adhesive properties such as lap shear strength when initially cured at room temperature. These properties lend the adhesive well to automated or complex assembly processes in which the adhesive is applied but not immediately thermally cured. By developing bond strength at room temperature (while maintaining a useful open time), the adhesive forms a temporary bond that is strong enough to permit the bonded parts to be manipulated until such time as a full thermal cure can be performed. If desired, the entire cure can be performed at ambient temperature.

The selection of polyol component a-2) in conjunction with the precipitated calcium carbonate has been found to lead to the rapid development of properties. In the presence of either alone, good open times can be achieved but the development of bond strength at room temperature is significantly slower.

Component a) of the polyol component of the adhesive is a mixture of polyether polyols. This mixture of polyether polyols constitutes at least 35% of the weight of the polyol component. It may constitute at least 40%, at least 45% or at least 50% of the weight of the polyol component, and may constitute up to 80%, up to 65% or up to 55% thereof.

Component a) includes at least polyols a-1) and a-2).

Polyol a-1) is one or more polyether polyols having a hydroxyl equivalent weight of 400 to 2000. The average nominal hydroxyl functionality of polyol a-1) is 2 to 4.

The hydroxyl equivalent weight of each of the polyether polyol(s) that constitutes polyol a-1) in some embodiments is at least 500, at least 800 or at least 1000, and in some embodiments is up to 1800, up to 1500 or up to 1200.

All hydroxyl equivalent weights herein are obtained by measuring hydroxyl number using a titration method such as that of ASTM E222 and converting the hydroxyl number so obtained (in mg KOH/gram) to equivalent weight using the formula equivalent weight=56,100÷hydroxyl number.

By "nominal functionality" of a polyether polyol (or mixture thereof), it is meant the average number of oxyalkylatable hydrogen atoms on the initiator compound(s) alkoxylated to form the polyether polyol(s). The actual functionalities of the polyether polyol(s) may be somewhat lower than the nominal functionality due to side-reactions that occur during the alkoxylation process. The number average nominal functionality of polyol a-1) preferably is 2 to 3.5 and especially 2.5 to 3.5.

In some embodiments, 50% or more of the hydroxyl groups of polyol a-1) are primary (with the remainder being secondary). 70% or more of the hydroxyl groups of polyol a-1) thereof may be primary.

Polyol a-1) may constitute for example, at least 5%, at least 10%, at least 20%, at least 30% or at least 40% of the total weight of the polyol component. It may constitute up to 78%, up to 63%, or up to 53% thereof.

Component a) further includes a-2) at least one polyether polyol having a hydroxyl equivalent weight of 100 to 399. Polyol a-2) has an average nominal functionality of at least 4. The nominal functionality is preferably at least 6 and may be at least 6.5. The nominal functionality may be up to 12, up to 10 or up to 8. The equivalent weight of each of the polyether polyol(s) that constitute polyol a-2) may be, for example, at least 125 or at least 150 and may be, for example, up to 350, up to 350, up to 275 or up to 250.

Polyol a-2) is present in an amount of at least 2 weight percent, based on the weight of the polyol component. It may constitute at least 3 or at least 4 weight percent thereof and may constitute up to 30%, up to 20%, up to 15%, up to 10%, up to 8% or up to 6% thereof.

Polyol(s) a-1) and a-2) each are selected from homopolymers of propylene oxide and copolymers of 70 to 99% by weight propylene oxide and 1 to 30% by weight ethylene oxide, in each case based on the combined weight of propylene oxide and ethylene oxide. In the case of a copolymer, the propylene oxide and ethylene oxide may be randomly copolymerized, block copolymerized, or both.

Component a) may include one or more other polyether polyols having a hydroxyl equivalent weight of at least 100, in addition to polyols a-1) and a-2). Such polyether polyols, if present at all, preferably constitute no more than 20 weight percent, no more than 10 weight percent or no more than 5 weight percent of component a).

Ingredient b) of the polyol component is one or more aliphatic diol chain extenders. The aliphatic diol chain extender(s) each have a hydroxyl equivalent weight of at least 25 and up to 99, preferably up to 90, more preferably up to 75 and still more preferably up to 60, and exactly two aliphatic hydroxyl groups per molecule. Examples of these are monoethylene glycol, diethylene glycol, triethylene glycol, 1,2-propane diol, 1,3-propane diol, 2,3-dimethyl-1,3-propanediol, dipropylene glycol, tripropylene glycol, 1,4-butanediol, 1,6-hexanediol and other linear or branched alkylene diols having up to about 6 carbon atoms. The aliphatic diol chain extender preferably includes monoethylene glycol, 1,4-butanediol or a mixture thereof.

The aliphatic diol chain extender or mixture thereof preferably is present in an amount of 1 to 8 equivalents per equivalent of polyol a-1). A preferred amount is 2 to 5 or 2 to 3.5 equivalents per equivalent of polyol a-1).

Ingredient c) of the polyol component is at least one compound having two or more primary and/or secondary aliphatic amine groups. Ingredient c) is optional and may be omitted. Such compounds preferably have a molecular weight of at least 60, more preferably at least 100, up to 1000, more preferably up to about 750 and still more preferably up to 500. Such compounds may have 2 to 4, more preferably 2 to 3, primary and/or second aliphatic amine groups and 2 to 8, more preferably 3 to 6 hydrogens bonded to aliphatic nitrogen atoms. Examples of the ingredient c) materials include ethylene diamine; 1,3-propanediamine; 1,2-propane diamine; polyalkylene polyamines such as diethylene triamine and triethylene tetraamine; isophorone diamine; cyclohexane diamine; bis(aminomethyl) cyclohexane and aminated polyethers such as those sold as Jeffamine™ D-400 and T-403 by Huntsman Corporation. The ingredient c) material, when present, provides a rapid initial thickening when the polyol and polyisocyanate components are first mixed, but is present in only a small amount so open time remains long enough that the adhesive can be mixed and applied in an industrial setting. The ingredient c) material therefore is present (if present at all) in an amount of 0.1 to 3 parts by weight per 100 parts by weight of ingredient a), and in some embodiments 0.25 to 2 parts by weight or 0.5 to 1.5 parts by weight on the same basis.

The polyol component further contains ingredient d), a catalytically effective amount of at least one urethane catalyst. A "urethane catalyst" for purposes of this invention is a material that catalyzes the reaction of a hydroxyl group with an isocyanate group. Suitable catalysts include, for example, tertiary amines, cyclic amidines, tertiary phosphines, various metal chelates, acid metal salts, strong bases, various metal alcoholates and phenolates and metal salts of organic acids.

The catalyst may be or include one or more tin catalysts such as stannic chloride, stannous chloride, stannous octoate, stannous oleate, dimethyltin dilaurate, dibutyltin dilaurate, tin ricinoleate and other tin compounds of the formula $SnR_n(OR)_{4-n}$, wherein R is alkyl or aryl and n is 0 to 18, and the like. Other useful tin catalysts include dialkyltin mercaptides such as dioctyltinmercaptide and dibutyltinmercaptide and dialkyltin thioglycolates such as dioctyltin thioglycolate and dibutyltin thioglycolate. Dialkyltin mercaptides and dialkyltin thioglycolates having at least 4 carbons in the alkyl groups tend to provide a beneficial degree of latency, which is believed to contribute to both the long open time and the rapid development of properties upon ambient temperature cure.

Examples of other metal-containing catalysts are bismuth, cobalt and zinc salts.

Examples of tertiary amine catalysts include trimethylamine, triethylamine, N-methylmorpholine, N-ethylmorpholine, N,N-dimethylbenzylamine, N,N-dimethylethanolamine, N,N,N',N'-tetramethyl-1,4-butanediamine, N,N-dimethylpiperazine, 1,4-diazobicyclo-2,2,2-octane, bis(dimethylaminoethyl)ether, triethylenediamine and dimethylalkylamines where the alkyl group contains from 4 to 18 carbon atoms. Useful amidine catalysts include 1,8-diazabicyclo[5.4.0]-undec-7-ene.

In some embodiments, the urethane catalyst includes at least one latent catalyst. For purposes of this invention, a latent catalyst is one which requires exposure to an elevated temperature of at least 40° C. to become catalytically active. (Note that this temperature can be generated during curing by the heat of exotherm of the adhesive during initial stages of cure.) Examples of such latent catalysts include, for example, dialkyltin thioglycolates such as dioctyltin thioglycolate and dibutyltin thioglycolate; carboxylic acid-blocked tertiary amine and/or cyclic amidine catalysts, in which the acid blocking group is, for example, a carboxylic acid such as a C1-C18 alkanoic acid, a benzoate or substituted benzoate and the like; and phenol-blocked tertiary amine and/or cyclic amidine catalsyts. Any of the tertiary amine and/or cyclic amidine catalysts described above can be acid-blocked or phenol-blocked in this manner to produce a latent catalyst. Specific examples include carboxylic acid-blocked triethylene diamine catalysts such as Niax™ 537 (Momentive Performance Products) and carboxylic acid-blocked 1,8-diazabicyclo[5.4.0]-undec-7-ene catalysts such as Toyocat DB41 (Tosoh Corporation) and Polycat SA-1/10 (Momentive Performance Products). An example of a phenol-blocked amidine catalyst is a phenol-blocked 1,8-diazabicyclo[5.4.0]-undec-7-ene such as Toyocat DB60 (Tosoh Corporation).

In still other embodiments, the catalyst (component d)) includes at least one catalyst selected from dibutyltin mercaptide, dioctyl tin mercaptide, dibutyltin thioglycolate and dioctyltin thioglycolate and at least one carboxylic acid- or phenol-blocked cyclic amidine catalyst. In particular embodiments, the catalyst (component d)) includes dibutyltin thioglycolate and/or dioctyltin thioglycolate and at least one carboxylic acid- or phenol blocked 1,8-diazabicyclo[5.4.0]-undec-7-ene. In other particular embodiments, the catalyst (component d)) includes dibutyltin thioglycolate and/or dioctyltin thioglycolate, at least one carboxylic acid-blocked cyclic amidine (such as 1,8-diazabicyclo[5.4.0]-undec-7-ene) and at least one phenol-blocked cyclic amidine (such as 1,8-diazabicyclo[5.4.0]-undec-7-ene). In any of the foregoing embodiments, the catalyst may exclude any catalysts other than those specifically mentioned.

The catalyst(s) are used in catalytically effective amounts, each catalyst being employed, for example, in an amount from about 0.0015 to about 5% by weight of the mixture of polyether polyol(s) a). A preferred amount is up to 0.5% or up to 0.25% on the same basis.

The polyol component contains 5 to 60 weight percent, based on the weight of the polyol component, of at least one particulate filler e). The particulate filler may constitute, for example, 10 to 60, 25 to 60, or 30 to 55 weight percent of the polyol component.

The particulate filler e) includes precipitated calcium carbonate filler particles having a particle size of up to 200 nm. The particle size may be, for example, from 10 to 200 nm, from 15 to 205 nm or from 25 to 200 nm. Particles sizes are conveniently measured using dynamic light scattering methods, or laser diffraction methods for particles having a size below about 100 nm.

"Precipitated" calcium carbonate is calcium carbonate made by reacting a slurry of starting materials to form calcium carbonate particles that precipitate from the slurry. Examples of such processes include hydrating high-calcium quicklime and reacting the resulting slurry with carbon dioxide (the "milk of lime" process), and reacting calcium chloride with soda ash and carbon dioxide.

The precipitated calcium carbonate particles having particle sizes of up to 200 nm may constitute, for example, at least 2 percent, at least 3 percent or at least 3.5 percent of the total weight of the polyol component. They may constitute, for example, up to 60 percent, up to 55 percent, up to 40%, up to 25%, up to 20%, up to 15%, or up to 12% of the total weight of the polyol component.

The filler (component d)) may in addition include particles in addition to the precipitated calcium carbonate particles having particle size of up to 200 nm. Those additional filler particles, if present, may have a particle size of greater than 200 nm, such as at least 500 nm or at least 1 μm, up to, for example, 50 μm, 25 μm or 10 μm.

The additional filler particles (if present) are of a solid material at room temperature, and are not soluble in the other ingredients of the polyol component or in the polyisocyanate component or any ingredient thereof. The particles are of one or more materials that do not melt, volatilize or degrade under the conditions of the curing reaction between the polyol and polyisocyanate components. The additional filler particles may be, for example, an inorganic material such as glass, silica, boron oxide, boron nitride, titanium oxide, titanium nitride, fly ash, ground (but not precipitated) calcium carbonate, precipitated calcium carbonate with particle size >200 nm, various alumina-silicates including clays such as wollastonite and kaolin, metal particles such as iron, titanium, aluminum, copper, brass, bronze and the like, thermoset polymer particles such as polyurethane, cured epoxy resin, phenol-formaldehyde, cresol-formaldehyde, crosslinked polystyrene and the like, thermoplastics such as polystyrene, styrene-acrylonitrile copolymers, polyimide, polyamide-imide, polyether ketone, polyether-ether ketone, polyethyleneimine, poly(p-phenylene sulfide), polyoxymethylene, polycarbonate and the like; and various types of carbon such as activated carbon, graphite, carbon black and the like. The additional filler particles in some embodiments have an aspect ratio of up to 5, preferably up to 2, more preferably up to 1.5.

Some or all of the additional filler particles, if present, can be grafted onto one or more of the polyether polyol(s) that constitute ingredient (a) of the polyol component.

The additional filler particles, if present, may constitute up to 58%, up to 53% or up to 50% of the total weight of the polyol component. The additional filler particles may constitute, for example, at least 4%, at least 8%, at least 20%, at least 25% or at least 30% thereof.

Another optional ingredient is one or more dispersing aids, which wet the surface of the filler particles and help them disperse into the polyether polyol(s). These may also have the effect of reducing viscosity. Among these are, for example, various dispersing agents sold by BYK Chemie under the BYK, DISPERBYK and ANTI-TERRA-U tradenames, and fluorinated surfactants such as FC-4430, FC-4432 and FC-4434 from 3M Corporation. If present at all, such dispersing aids may constitute, for example, up to 2 weight percent, preferably up to 1 weight percent, of the polyol component.

Another useful optional ingredient of the polyol component is a desiccant such as fumed silica, silica gel, aerogel, various zeolites and molecular sieves, and the like. One or more desiccants may constitute up to 5 weight percent, preferably up to 2 weight percent of the polyol component, and may be absent from the polyol component. Dessicants do not count toward the weight of component e).

The polyol component may further include one or more additional isocyanate-reactive compounds, different from ingredients a)-d) of the polyol component. If any such additional isocyanate-reactive compound(s) are present, they preferably constitute no more than 10 percent, more preferably no more than 5 percent and even more preferably no more than 2 percent, of the weight of the polyol component. Examples of such additional isocyanate-reactive compounds include, for example, one or more polyester polyols, and one or more crosslinkers having three or more isocyanate-reactive groups per molecule and a hydroxyl equivalent weight of up to 99.

The adhesive of the invention preferably is non-cellular after curing. For that reason, the polyol component preferably contains no more than 0.5% by weight, more preferably no more than 0.1% by weight of organic compounds having a boiling temperature of 80° C. or less, and no more than 0.1% by weight, more preferably no more than 0.05% by weight, of water and/or other chemical blowing agents that produce a gas under the conditions of the curing reaction.

The polyol component in some embodiments contains no more than 10 weight percent, more preferably no more than 5 weight percent, and even more preferably no more than 1 weight percent, of a plasticizer such as a phthalate, terephthalate, mellitate, sebacate, maleate or other ester plasticizer, a sulfonamide plasticizer, a phosphate ester plasticizer, or a polyether di(carboxylate) plasticizer. Such a plasticizer most preferably is absent from the polyol component.

The polyisocyanate component includes at least one organic polyisocyanate.

All or a portion of the organic polyisocyanate may consist of one or more organic polyisocyanates having an isocyanate equivalent weight of up to 350, such as 80 to 250, 80 to 200, or 80 to 180. If a mixture of such polyisocyanate compounds is present, the mixture may have, for example, an average of 2 to 4 or 2.3 to 3.5 isocyanate groups per molecule. Among such polyisocyanate compounds are aromatic polyisocyanates such as m-phenylene diisocyanate, toluene-2,4-diisocyanate, toluene-2,6-diisocyanate, naphthylene-1,5-diisocyanate, methoxyphenyl-2,4-diisocyanate, diphenylmethane-4,4'-diisocyanate, diphenylmethane-2,4'-diisocyanate, 4,4'-biphenylene diisocyanate, 3,3'-dimethoxy-4,4'-biphenyl diisocyanate, 3,3'-dimethyl-4-4'-biphenyl diisocyanate, 3,3'-dimethyldiphenyl methane-4,4'-diisocyanate, 4,4',4''-triphenyl methane triisocyanate, polymethylene polyphenylisocyanate (PMDI), toluene-2,4,6-triisocyanate and 4,4'-dimethyldiphenylmethane-2,2',5,5'-tetraisocyanate. Modified aromatic polyisocyanates that contain urethane, urea, biuret, carbodiimide, uretoneimine, allophonate or other groups formed by reaction of an isocyanate groups are also useful. A preferred aromatic polyisocyanate is MDI or PMDI (or a mixture thereof that is commonly referred to as "polymeric MDI"), and so-called "liquid MDI" products that are mixtures of MDI and MDI derivatives that have biuret, carbodiimide, uretoneimine and/or allophonate linkages.

Further useful polyisocyanate compounds having an isocyanate equivalent weight of up to 350 include one or more aliphatic polyisocyanates. Examples of these include cyclohexane diisocyanate, 1,3- and/or 1,4-bis(isocyanatomethyl)cyclohexane, 1-methyl-cyclohexane-2,4-diisocyanate, 1-methyl-cyclohexane-2,6-diisocyanate, methylene dicyclohexane diisocyanate, isophorone diisocyanate and hexamethylene diisocyanate.

The polyisocyanate compound(s) having an isocyanate equivalent weight of up to 350 may constitute up to 100% of the weight of the polyisocyanate component. However, it is generally preferred to adjust the isocyanate equivalent weight of the polyisocyanate component to be comparable to (such as from 0.5 to 2 times) the hydroxyl equivalent weight of the polyol component, as this facilitates mixing of roughly equal weights and volumes of the polyol and polyisocyanate components when the adhesive is applied and cured. Accordingly, it is preferred that the polyisocyanate compounds having an isocyanate equivalent weight of up to 350 constitute at most 50%, more preferably at most 30%, of the total weight of the polyisocyanate component.

The polyisocyanate component may contain at least one urethane group-containing, isocyanate-terminated prepolymer having at least 2 isocyanate groups per molecule and an isocyanate equivalent weight of 500 to 3500. The prepolymer may be a reaction product of one or more diisocyanates (preferably one or more aromatic diisocyanates) having a molecular weight of up to 350 with i) at least one 700 to 3000 molecular weight homopolymer of poly(propylene oxide) having a nominal hydroxyl functionality of 2 to 4, ii) at least one 2000 to 8000 molecular weight polyether polyol which is a copolymer of 70 to 99 weight percent propylene oxide and 1 to 30 weight percent ethylene oxide and has a nominal hydroxyl functionality of 2 to 4, or iii) a mixture of i) and ii).

In the case of a mixture of i) and ii), the poly(propylene oxide) used to make the prepolymer may have a molecular weight of 800 to 2000 and more preferably from 800 to 1500, and preferably has a nominal functional of 2 to 3, especially 2. The copolymer of 70 to 99 weight percent propylene oxide and 1 to 30 weight percent ethylene oxide used to make the prepolymer preferably may have a molecular weight of 3000 to 5500 and a nominal functionality of 2 to 3.

The isocyanate-terminated prepolymer has an isocyanate equivalent weight of 500 to 3500, more preferably 700 to 3000 and even more preferably 1000 to 3000. The equivalent weight for purposes of this invention is calculated by adding the weight of the polyol(s) used to prepare the prepolymer and the weight of polyisocyanate(s) consumed in reaction with the polyol, and dividing by the number of isocyanate groups in the resulting prepolymer. The number of isocyanate groups can be determined using titration methods such as ASTM D2572.

Such a prepolymer may constitute 20 to 65 percent of the weight of the polyisocyanate component. In some embodiments, it constitutes 20 to 60 percent, 20 to 50 percent or 25 to 35 percent of the weight of the polyisocyanate component.

The polyisocyanate used to make the prepolymer can be any of the polyisocyanate compounds identified above, or a mixture of two or more of these. The prepolymer has at least 2, preferably 2 to 4, especially 2 to 3, isocyanate groups per molecule. The isocyanate groups of the prepolymer may be aromatic, aliphatic (including alicyclic), or a mixture of aromatic and aliphatic isocyanate groups. The isocyanate groups on the prepolymer molecules preferably are aromatic.

It is preferred that at least some of the polyisocyanate groups present in the polyisocyanate component are aromatic isocyanate groups. If a mixture of aromatic and aliphatic isocyanate groups is present, it is preferred that at least 50% by number, more preferably at least 75% by number, are aromatic isocyanate groups. In some preferred embodiments, 80 to 95% by number of the isocyanate groups are aromatic and 5 to 20% by number are aliphatic. It is especially preferred that the isocyanate groups of the prepolymer are aromatic, and the isocyanate groups of the polyisocyanate compound(s) having an isocyanate equivalent weight of up to 350 are a mixture of 80 to 95% aromatic isocyanate groups and 5 to 20% aliphatic isocyanate groups.

The polyisocyanate component may contain up to 50% by weight of one or more particulate inorganic fillers as described before. In some embodiments, the polyisocyanate component contains at least 20% by weight of one or more such fillers, and may contain, for example, 20 to 50% or 30 to 40% by weight thereof.

The polyisocyanate component may also contain one or more other additional ingredients, such as those described above with respect to the polyisocyanate compound. As with the polyol component, the polyisocyanate component preferably contains no more than 0.5% by weight, more preferably no more than 0.1% by weight of organic compounds having a boiling temperature of 80° C. or less, and no more than 0.1% by weight, more preferably no more than 0.05% by weight, of water and/or other chemical blowing agents that produce a gas under the conditions of the curing reaction. The polyisocyanate component in some embodiments contains no more than 30 weight percent, more preferably no more than 20 weight percent, of a plasticizer such as a phthalate, terephthalate, mellitate, sebacate, maleate or other ester plasticizer, a sulfonamide plasticizer, a phosphate ester plasticizer, or a polyether di(carboxylate) plasticizer. Such a plasticizer may be absent from the polyisocyanate component.

It is generally useful to formulate the polyol component and polyisocyanate component such that when equal volumes of the components are provided, the isocyanate index is 0.5 to 3.6. This facilitates the use of simple mixing ratios of 2:1 to 1:2, especially about 1:1 by volume. It is more preferred to formulate the components so that the isocyanate index is 0.9 to 1.8 or 1.1 to 1.8 when equal volumes of the components are provided. For purposes of this invention, "isocyanate index" is the ratio of the number of isocyanate groups in the polyisocyanate component to the number of isocyanate-reactive groups in the polyol component when the polyol and polyisocyanate components are combined. For purposes of this calculation, a primary amino group is considered as a single isocyanate-reactive group, even though it has two amine hydrogen atoms. A preferred isocyanate index, at a 1:1 volume ratio, is 1.1 to 1.65 or 1.1 to 1.3.

The invention is also a process for bonding two substrates. In general, the polyol component and the isocyanate component are combined to form a reaction mixture. The ratio of these materials may be, for example, such that the isocyanate index is 0.9 to 1.8, 1.1 to 1.8, 1.1 to 1.65 or 1.1 to 1.3. The reaction mixture is formed into a layer between and in contact with the two substrates. An adhesion promoter may be applied to one or both of the substrates prior to contacting the substrate(s) with the adhesive. The adhesive layer is then cured between and in contact with the two substrates to form a layer of cured adhesive bonded to each of the two substrates.

The methods used to mix the isocyanate component with the polyol component, form the adhesive layer and cure the adhesive are, broadly speaking, not critical and a variety of types of apparatus can be used to perform these steps. Thus, the isocyanate component and polyol component can be mixed manually, in various types of batch apparatus, and/or using various sorts of automated metering, mixing and dispensing equipment.

The polyol component and isocyanate component often will react spontaneously upon mixing at room temperature (about 22° C.) and cure without the need to heat the adhesive to a greater temperature. Therefore, in some embodiments, curing is effected by simply mixing the components at a temperature of, for example, 0 to 35° C. and allowing the components to react at that temperature.

Heat can be applied to the adhesive to obtain a more rapid cure. The polyol and isocyanate components can be heated separately and then mixed and cured, with or without further applied heat. Alternatively, the polyol and isocyanate components can be mixed at a lower temperature, such as 0 to 35° C. followed by heating the mixture to a higher cure temperature. The substrate can be heated before applying the adhesive if desired. If an elevated temperature is used in the curing step, such a temperature may be, for example, 36 to 100° C., or 40 to 65° C.

In some embodiments, the adhesive is formulated to provide a latent cure, i.e., a prolonged "open time" during which the adhesive remains flowable and thus allows for manipulation of the adhesive itself and/or a substrate in contact with the adhesive. In some embodiments, the adhesive exhibits an open time of at least 2 minutes, preferably at least 4 minutes, when mixed and cured at room temperature (22±2° C.). For purposes of this invention, open time is measured rheologically by measuring complex viscosity vs. time at room temperature. The polyol and polyisocyanate components are mixed and immediately applied to the plates of a parallel plate rheometer operating in oscillating mode. Plate diameter is 20 mm, plate separation is 1 mm plate. The reactivity measurements are performed at 10 Hz with a constant deformation of 0.062%. The complex viscosity is plotted against the time; and the time at which the slope of the complex viscosity curve has increased by 30% compared to its initial slope is considered to be the open time.

An advantage of the invention is that despite having a useful open time, it is still capable of developing adhesive strength in a reasonably short time period even when cured at a temperature of 0 to 35° C. The development of adhesive strength can be evaluated by measuring the lap shear strength of the adhesive bond after 30 minutes of ambient temperature curing, in the manner described in the following examples. The lap shear strength on this test may be at least 3 MPa or at least 3.5 MPa, and may be, for example, up to 10 MPa, up to 7.5 MPa or up to 6 MPa.

The substrates are not limited. They can be, for example, a metal, a metal alloy, an organic polymer, a lignocellulosic material such as wood, cardboard or paper, a ceramic material, various types of composites, or other materials. Carbon fiber reinforced plastic is a substrate of particular interest. The substrates in some embodiments are vehicular parts or vehicular sub-assemblies that are adhered together with a cured adhesive composition of the invention. The substrates in other embodiments are individual plies that are glued together using the adhesive of the invention to form a multilayer laminate. The substrates in other embodiments are building members.

The following examples are provided to illustrate the invention, but are not intended to limit the scope thereof. All parts and percentages are by weight unless otherwise indicated. In the following examples:

Polyol A is a nominally trifunctional ethylene oxide-capped poly(propylene oxide) having a molecular weight of about 4800 g/mol and a hydroxyl equivalent weight of about 1600.

The High Functionality Polyol is a 1400 molecular weight, nominally 7.0 functional poly(propylene oxide) made by alkoxylating a mixture of sucrose and glycerine.

Polyol B is a nominally difunctional poly(propylene oxide) having a molecular weight of about 2000 and a hydroxyl equivalent weight of about 1000.

The Catalyst Mixture is a mixture of a dioctyltin dithioglycolate catalyst, a phenol-blocked DBU catalyst and a phthalic acid-blocked DBU catalyst.

The calcined kaolin is commercially available as Polestar™200R from Imerys Performance Minerals. It has an average particle size of 2 μm (90% greater than 10 μm), a BET surface area of 8.5 m$^2$/g and a pH of 5.0 to 6.5.

The Ground $CaCO_3$ is commercially available as Carbital 140 from Imerys Performance Minerals. This product is milled to below 45 μm particle size.

The Precipitated $CaCO_3$ is commercially available as Calofort® SV pcc from Mineral Technologies Inc. All particles are smaller than 200 nm, with most being between 20 and 100 nm in size. This product contains about 3% by weight of a stearate coating.

EXAMPLE 1 AND COMPARATIVE SAMPLES A-D

Polyol Components used in Example 1 and Comparative Samples A-D are made by mixing ingredients as indicated in Table 1.

TABLE 1

| | Parts By Weight | | | | |
|---|---|---|---|---|---|
| Ingredient | Comp. A* | Comp. B* | Comp. C* | Comp. D* | Ex. 1 |
| | Polyol Component | | | | |
| Polyol A | 49.04 | 45.44 | 49.04 | 45.44 | 45.44 |
| High Functionality Polyol | 0 | 4.5 | 0 | 4.5 | 4.5 |
| 1,4-Butanediol | 5 | 4.1 | 5 | 4.1 | 4.1 |
| Catalyst Mixture | 0.17 | 0.17 | 0.17 | 0.17 | 0.17 |
| Hydrophobically Modified Fumed Silica | 1.5 | 1.5 | 1.5 | 1.5 | 1.5 |
| Molecular Sieves | 4 | 4 | 4 | 4 | 4 |
| Calcined Kaolin | 40.29 | 40.29 | 30.29 | 30.29 | 30.29 |
| Ground $CaCO_3$ | 0 | 0 | 0 | 10 | 0 |
| Precipitated $CaCO_3$ | 0 | 0 | 10 | 0 | 10 |

*Not an example of this invention.

A polyisocyanate component is prepared in the following manner.

A plasticized prepolymer in each case is prepared by mixing 17.74 parts of Polyol A, 12.09 parts of Polyol B, 27.5 parts of a MDI product containing mostly the 4,4'-isomer and equivalent weight of about 143, 18.07 parts of a plasticizer and a urethane catalyst, and heating the resulting mixture under nitrogen until a constant isocyanate content is reached. This plasticized prepolymer contains approximately 66 weight-% of prepolymer molecules and 34 weight-% plasticizer. 53.5 parts of this plasticizer are then blended with 5 parts of an aliphatic polyisocyanate product based on hexamethylene diisocyanate and having an isocyanate equivalent weight of 193, 22.5 parts of a "liquid MDI" product having an isocyanate functionality of about 2.2 and 19 parts of carbon black (Printex 30 from Alzchem) to form the polyisocyanate component.

Adhesive Example 1 and Comparative Adhesive Samples A-D are made by separately combining the polyisocyanate component with each of polyol component Ex. 1 and Comparative Samples A-D, respectively, at a 1:1 volume ratio (to produce an isocyanate index of about 1.1 to 1.3). This is accomplished by loading the respective components into cartridges and mounting the cartridges onto a double cartridge application gun mounted with a static mixer unit.

Open time is measured rheometrically using the method described earlier.

Lap shear strength measurements are performed according to DIN EN 1465 (2009) on a Zwick 1435 tensile tester equipped with a FHM 8606.00.00 or 8606.04.00 mounting device. The substrates are E-coated Cathoguard 500 e-coated steel panels having dimensions of 100×25×0.8 mm. The substrates are cleaned with heptane and allowed to dry for 5 minutes prior to applying the adhesive. The adhesive bond dimensions are 10×25×1.5 mm. Test specimens are evaluated tested after 30 minutes curing time at 23° C./50% relative humidity and again after 7 days curing under those conditions.

Results of the foregoing testing are as indicated in Table 2.

TABLE 2

| | Result | | | | |
|---|---|---|---|---|---|
| Property | Comp. Sample A* | Comp. Sample B* | Comp. Sample C* | Comp. Sample D* | Ex. 1 |
| High Functionality Polyol | None | Present | None | Present | Present |
| Precipitated $CaCO_3$ | None | None | Present | None | Present |
| Ground $CaCO_3$ | None | None | None | Present | None |
| Open time (by rheology), minutes | 5.2 | 6.3 | 4.2 | 6.5 | 4.9 |
| 30 minute RT lap shear strength, MPa | 1.86 | 2.43 | 1.96 | 2.31 | 4.02 |
| 7 d RT lap shear strength, MPa | 8.85 | 8.57 | 8.95 | 8.27 | 8.31 |

*Not an example of this invention.

As can be seen from the data in Table 2, Example 1 (inventive) exhibits a similar open time as the comparative samples. However, its lap shear strength after 30 minutes of room temperature curing is 1.5 to 2 times those of the comparative samples. After 7 days room temperature curing, all samples have developed similar lap shear strengths.

These results demonstrate the benefits of using both the high functionality polyol and the precipitated $CaCO_3$. When neither are present (as in Comp. Sample A), 30 minute lap shear strength is very low. Including either the high functionality polyol by itself (Comp. Sample B) or the precipitated $CaCO_3$ by itself (Comp. Sample C) provides at most a small increase in 30 minute lap shear strength. When both are present (Ex. 1), the 30 minute shear strength increases dramatically without significant loss of open time or shear strength at full cure (7 day RT).

Comparative Sample D shows the effect of using a ground $CaCO_3$ rather than precipitated $CaCO_3$. The ground material provides little if any benefit in room temperature curing properties.

What is claimed is:

1. A two-component polyurethane adhesive composition having a polyol component and an isocyanate component, wherein:
   the polyol component comprises:
   a) at least 35 weight percent, based on the weight of the polyol component, of a mixture of polyether polyols, the mixture of polyether polyols comprising
      a-1) one or more polyether polyols each having a hydroxyl equivalent weight of 400 to 2000 and each being selected from homopolymers of propylene oxide and copolymers of 70 to 99% by weight propylene oxide and 1 to 30% by weight ethylene oxide, the one or more polyether polyols a-1) having an average nominal hydroxyl functionality of 2 to 4; and
      a-2) one or more polyether polyols each having a hydroxyl equivalent weight of 100 to 399, the one or more polyether polyols a-2) having an average nominal functionality of at least 4, wherein the one or more polyether polyols a-2) are present in an amount of at least 2 weight percent, based on the weight of the polyol component;
   b) one or more aliphatic diol chain extenders having a hydroxyl equivalent weight of up to 99;
   c) 0 to 3 parts by weight per 100 parts by weight of a) at least one compound having at least two primary and/or secondary aliphatic amine groups;
   d) a catalytically effective amount of at least one urethane catalyst;
   e) 5 to 60 weight percent, based on the weight of the polyol component, of at least one particulate filler, wherein the particulate filler includes precipitated calcium carbonate filler particles having a particle size of up to 200 nm;
   and the polyisocyanate component comprises at least one organic polyisocyanate and 0 to 50% by weight, based on the total weight of the polyisocyanate component, of at least one particulate filler.

2. The two-component polyurethane adhesive of claim 1 wherein the precipitated calcium carbonate filler particles having a particle size of up to 200 nm constitute at least 2 wt-% of the polyol component.

3. The two-component polyurethane adhesive of claim 2 wherein the precipitated calcium carbonate filler particles having a particle size of up to 200 nm constitute at least 3.5 to 20 wt-% of the polyol component.

4. The two-component polyurethane adhesive of claim 1 wherein a-2) constitutes at least 2 weight-% of the polyol component.

5. The two-component polyurethane adhesive of claim 4 wherein a-2) constitutes 3 to 10 wt-% of the polyol component.

6. The two-component polyurethane adhesive of claim 1 wherein component e) includes at least one additional particulate filler, the additional particulate filler constituting 20 to 58 wt-% of the polyol component.

7. The two-component polyurethane adhesive of claim 1, wherein d) includes at least one latent urethane catalyst.

8. The two-component polyurethane adhesive of claim 7 wherein the latent catalyst includes at least one catalyst selected from dibutyltin mercaptide, dioctyl tin mercaptide, dibutyltin thioglycolate and dioctyltin thioglycolate and at least one carboxylic acid- or phenol-blocked cyclic amidine catalyst.

9. The two-component polyurethane adhesive of claim 1 wherein the polyisocyanate component includes at least one polyisocyanate having an isocyanate equivalent weight of up to 350 and at least one one urethane group-containing, isocyanate-terminated prepolymer having at least 2 isocyanate groups per molecule and an isocyanate equivalent weight of 500 to 3500.

10. The two-component polyurethane adhesive of claim 1 wherein the polyisocyanate component includes 20 to 50 wt-%, based on the weight of the polyisocyanate component, of a particulate filler.

11. A cured adhesive formed by combining the polyol and polyisocyanate components of the two-component polyurethane adhesive of claim 1 to form an uncured adhesive, and then curing the uncured adhesive.

12. A method of bonding two substrates, comprising combining the polyol and polyisocyanate components of the two-component polyurethane adhesive of claim 1 to form an uncured adhesive, forming a layer of the uncured adhesive at a bondline between two substrates, and curing the uncured adhesive layer at the bondline to form a cured adhesive bonded to each of the substrates.

13. The method of claim 12 wherein the isocyanate index is 1.1 to 1.8.

14. The method of claim 12 wherein at least a portion of said curing is performed at a temperature of 0 to 35° C.

15. The method of claim 14 wherein a portion of said curing is performed at a temperature of 0 to 35° C. and a subsequent portion of said curing is performed at a temperature of 36 to 100° C.

* * * * *